United States Patent [19]

Gawlick

[11] 4,245,908
[45] Jan. 20, 1981

[54] APPARATUS FOR CONTROLLING AND MONITORING THE DISPERSIVE ELEMENT AND RECORDING INSTRUMENT IN SPECTROMETRIC APPARATUS

[75] Inventor: Horst-Gerhard Gawlick, Uberlingen, Fed. Rep. of Germany

[73] Assignee: Bodenseewerk Perkin-Elmer Co., Uberlingen, Fed. Rep. of Germany

[21] Appl. No.: 964,752

[22] Filed: Nov. 29, 1978

[30] Foreign Application Priority Data

Dec. 7, 1977 [DE] Fed. Rep. of Germany ....... 2754444

[51] Int. Cl.³ .............................................. G01J 3/18
[52] U.S. Cl. .................................. 356/328; 356/332; 356/334
[58] Field of Search ............... 356/326, 328, 331, 332, 356/333, 334

[56] References Cited

U.S. PATENT DOCUMENTS

| 3,868,499 | 2/1975 | Aaronson et al. | 356/326 |
| 3,976,378 | 8/1976 | Pratt | 356/325 |
| 3,985,442 | 10/1976 | Smith et al. | 356/326 |

FOREIGN PATENT DOCUMENTS

| 1159663 | 12/1973 | Fed. Rep. of Germany . |
| 2513225 | 10/1975 | Fed. Rep. of Germany . |
| 1328370 | 8/1973 | United Kingdom . |
| 1464035 | 2/1977 | United Kingdom . |
| 1521914 | 8/1978 | United Kingdom . |
| 1532576 | 11/1978 | United Kingdom . |

OTHER PUBLICATIONS

Applied Spectroscopy, vol. 28,#1, 1974, pp. 45–51.

Primary Examiner—Vincent P. McGraw
Attorney, Agent, or Firm—Salvatore A. Giarratana; Francis L. Masselle; Edwin T. Grimes

[57] ABSTRACT

The invention relates to a spectrometer including a rotatable dispersive element, a stepping motor for varying the angular position of said dispersive element, a program transmitter for controlling said stepping motor, a timing generator and a recording instrument.

4 Claims, 1 Drawing Figure

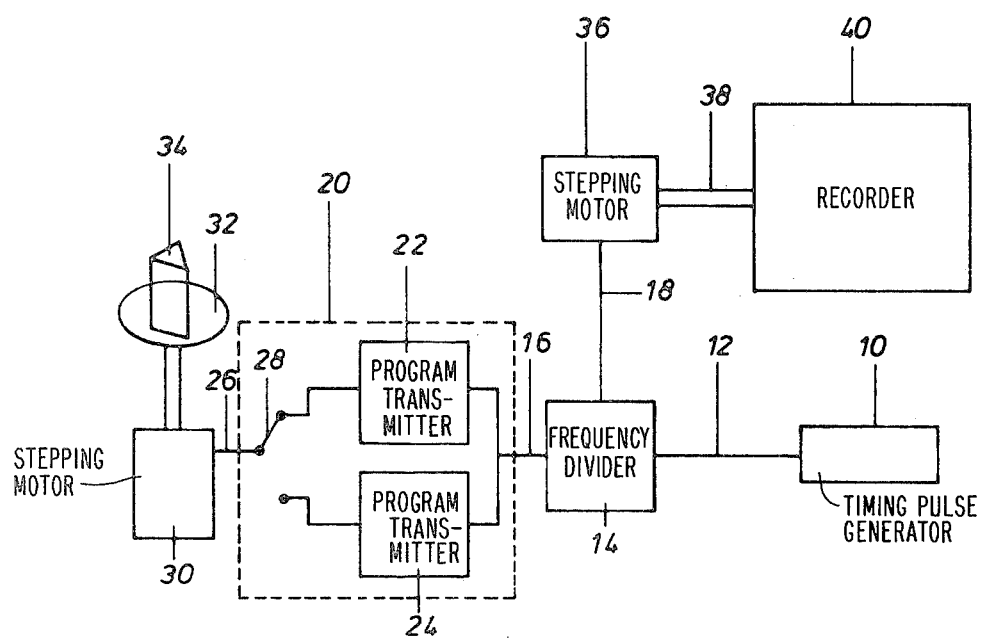

APPARATUS FOR CONTROLLING AND MONITORING THE DISPERSIVE ELEMENT AND RECORDING INSTRUMENT IN SPECTROMETRIC APPARATUS

BACKGROUND OF THE INVENTION

The invention relates to a spectrometer wherein a spectrum is scanned by the rotation of a dispersive element. The wavelength or the wavenumber may be selected as the input variable. Depending on the selected input variable, the dispersive element will be rotated by such an angle that the radiation corresponding to the preselected wavelength or wavenumber, respectively, will be incident on the exit slit of the spectrometer. Usually, the recording strip of a recorder is moved in the abscissa direction in linear dependence on the input variable, i.e. either on wavelength or the wavenumber, and the associated absorption or transmission is recorded in ordinate direction.

Generally, the relationship of the input variable to the respectively associated rotational angle of the dispersive element will be non-linear. When a grating is employed as the dispersive element, said non-linear relationship will be represented by an angular function. If the wavelength serves as the input variable, the sine of the rotational angle will be proportional to the input variable. If the wavenumber serves as the input variable, the proportionality will exist between the input variable and the reciprocal of the sine of the rotational angle.

In known apparatus the non-linear relation was realized by lever gears, the input adjustment of which was linearly dependent on the input variable and the output adjustment of which produced a rotational angle depending on the input variable, in accordance with the respectively desired function. An example of such mechanical equipment is shown in German Auslegeschrift No. 1,159,663.

When a prism is employed as the dispersive element, an empirically determined function, which cannot be represented analytically, will result as the relationship between the input variable and the rotational angle. As a result the function has to be stored on a control cam plate, which is scanned by a sensing lever.

All such mechanical gear means require high precision and accurate adjustment and thus are expensive to manufacture. Furthermore, there are difficulties in designing a spectrometer in such a way as to enable the spectrum to be scanned, selectively, in dependence on either a linearly variable wavelength or a linearly variable wavenumber.

It is known to use a stepping motor as the adjusting motor for the dispersive element. However, when the stepping motor was controlled, selectively, in accordance with either the wavelength or the wavenumber, mechanically operated gear means had to be provided intermediate the stepping motor and the dispersive element (German Offenlegungsschrift No. 2,513,225).

U.S. Pat. No. 3,976,378 shows a spectrometer in which the recorder and the mechanism for rotating the prism are each driven by a separate stepping motor. The pulses for advancing both of the stepping motors are generated by a common timing pulse generator with a frequency divider, providing for the two different rotational speeds. However, these two speeds are in a well-defined ratio with respect to each other. The mechanism for rotating the prism comprised a cam plate, which transformed the rotational angle of the stepping motor, varying linearly with the desired wavelength, to the prism, the rotation of which varied non-linearly with the wavelength.

Furthermore, a computer controlled spectrometer is known, which included a rotatable dispersive element, a stepping motor for varying the angular position of said dispersive element, a program transmitter for controlling said stepping motor, a timing pulse generator, and a recording instrument (Applied Spectroscopy, Vol. 28, No. 1 (1974), Pages 45 to 51).

In said known spectrometer the spectrum was scanned step-wise in equal steps of 1 $cm^{-1}$ with each step being within a preselected wavenumber range. This operation was controlled by the program transmitter by adjusting the monochromator to the initial wavelength, determining the base line and, in each step, adjusting the multiplier voltage and taking the measurement. After each measurement a test was performed to determine whether or not the terminal wavelength of the wavelength range to be scanned had been reached. If not, the monochromator was advanced by one step in wavenumbers and the subroutines "Adjusting multiplier voltage" and "Measuring" were repeated.

Advancement of the monochromator by equal steps in wavenumber was achieved by means of a stepping motor. Each step thereof had to correspond to a constant step of 1 $cm^{-1}$ in wavenumbers. Since, as stated in the publication, the relationship between the wavenumbers and the number of steps of the stepping motor was non-linear, it was necessary to provide non-linear gear means intermediate the stepping motor and the dispersive element in order to realize continuously equal steps in wavenumber.

SUMMARY OF THE INVENTION

Therefore, it is an object of the invention to provide a spectrometer of the class described, using simpler means and without employing expensive mechanical gearing.

The foregoing and other objects of the invention are accomplished by providing a spectrometer comprising:
(a) a program transmitter including a register, in the positions of which are stored the values of a function representing the non-linear relationship of the angular position of the dispersive element with respect to the wavelength or wavenumber, respectively;
(b) a timing pulse generator connected to said register for addressing each one of the positions thereof,
(c) adjusting means for adjusting the stepping motor corresponding to the contents of addressed register positions, respectively, and
(d) the timing pulse generator being connected to a recording instrument for controlling the advance thereof in the abscissa direction.

Thus, in the spectrometer according to the invention, the dispersive element is controlled digitally, i.e. in discrete steps and in dependence on an input variable given in the form of a sequence of pulses, which is the sequence of timing pulses. The non-linear function is digitally provided by the program transmitter. Such a device may be assembled from a commercially available stepping motor and commercially available digitally operating electronic components. Mechanical non-linear gear means can be dispensed with.

BRIEF DESCRIPTION OF THE DRAWING

The FIGURE is a schematic block diagram showing the drive means for a dispersive prism in a spectrometer, according to the invention.

DESCRIPTION OF THE PREFERRED EMBODIMENT

In the embodiment of the invention illustrated, a timing pulse generator 10 supplies high frequency pulses to a frequency divider 14 via line 12. A first sequence of timing pulses is generated by frequency divider 14 at an output 16 and a second sequence of timing pulses at output 18. The frequency divider 14 is designed to be switched between different divisional ratios, separately for each one of the outputs, 16 and 18.

The output 16 of the frequency divider 14 is connected to a program transmitter 20, which includes two program registers 22 and 24. One of the program registers 22 includes a fixed-value register (ROM) for storing the non-linear function, which represents the relationship of the wavelength to the rotational angle, and the other program register 24 includes a fixed-value register (ROM) for storing the non-linear function, which represents the relationship of the wavenumber to the rotational angle. The positions in the fixed-value register are addressed in series by the timing pulses of the timing pulse generator 10 or (in the case of a frequency division) by the frequency divider 14. In addition, means are provided for converting the non-linear function, as derived from the fixed-value register, into a corresponding pulse sequence at an output 26. The selected one of said fixed-value registers is adapted to be switched on by switch 28.

The register function may also be performed by a computer in the case where the relationship between the input variable and the rotational angle is given by a function which can be represented analytically, such as by a sine function, for example. In such a case the program transmitter includes a computer for computing the function depending on the timing pulses applied thereto and means to generate a sequence of pulses in accordance with said function, said sequence of pulses being fed to the stepping motor. Also, in such a case, different programs, which may be selectively called, may be provided for computing different functions.

The sequence of pulses at output 26 of the program transmitter 20 is applied to a stepping motor 30. The stepping motor 30 rotates a table 32, which carries a dispersive element 34 (grating; prism) placed in the path of the rays of the spectrometer.

A second stepping motor 36 is connected to the second output 18 of the frequency divider 14. The stepping motor 36 through a shaft 38 drives the recording drum of a recorder 40 in the abscissa direction (circumferential direction) in linear dependence on the input variable as given by the timing pulses. The transmission or absorption, respectively, as measured will be recorded as usual in the axial ordinate direction.

What I claim is:

1. A spectrometer including a rotatable dispersive element, a stepping motor for varying the angular position of said dispersive element, a program transmitter for controlling said stepping motor, a timing pulse generator, and a recording instrument,
   (a) said program transmitter comprising a register, in the positions of which are stored the values of a function representing the non-linear relationship of the angular position of the dispersive element to the wavelength or wavenumber, respectively,
   (b) said timing pulse generator being connected to said register for addressing each one of the positions thereof,
   (c) adjusting means for adjusting the stepping motor corresponding to the contents of the addressed register positions, respectively, and
   (d) said timing pulse generator also being connected to a recording instrument for controlling the advance thereof in the abscissa direction.

2. A spectrometer according to claim 1 wherein said dispersive element is a prism.

3. A spectrometer according to claim 1 wherein said dispersive element is a grating.

4. A spectrometer according to claim 1 or 2 or 3 wherein said program transmitter includes a first ROM in the positions of which are stored the values of a function representing the non-linear relationship of the angular position of the dispersive element to the wavelength, and a second ROM in the positions of which are stored the values of a function representing the non-linear relationship of the angular position of the dispersive element to the wavenumber,
   and wherein said adjusting means includes means for selectively switching said first ROM or said second ROM to said stepping motor.

* * * * *